(12) United States Patent
Gupta et al.

(10) Patent No.: US 9,836,307 B2
(45) Date of Patent: Dec. 5, 2017

(54) FIRMWARE BLOCK DISPATCH BASED ON FUSING

(71) Applicant: Intel Corporation, Santa Clara, CA (US)

(72) Inventors: Saurabh Gupta, Tacoma, WA (US); Vincent J. Zimmer, Federal Way, WA (US); Rajesh Poornachandran, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 113 days.

(21) Appl. No.: 14/748,656

(22) Filed: Jun. 24, 2015

(65) Prior Publication Data

US 2016/0378507 A1 Dec. 29, 2016

(51) Int. Cl.

| G06F 9/00 | (2006.01) |
|---|---|
| G06F 15/177 | (2006.01) |
| G06F 9/44 | (2006.01) |
| G06F 9/50 | (2006.01) |
| G06F 21/57 | (2013.01) |
| G06F 21/44 | (2013.01) |

(52) U.S. Cl.
CPC .......... *G06F 9/4403* (2013.01); *G06F 9/5011* (2013.01); *G06F 21/572* (2013.01); *G06F 21/44* (2013.01)

(58) Field of Classification Search
CPC ...... G06F 9/4403; G06F 9/5011; G06F 21/44; G06F 21/572
See application file for complete search history.

(56) References Cited

U.S. PATENT DOCUMENTS

| 6,976,119 B2 * | 12/2005 | Qureshi .............. G06F 13/4226 711/102 |
|---|---|---|
| 8,522,066 B2 | 8/2013 | Zimmer et al. |
| 2002/0120882 A1 * | 8/2002 | Sarangi ..................... G06F 1/24 713/600 |
| 2003/0226006 A1 | 12/2003 | Ballard |

(Continued)

OTHER PUBLICATIONS

International Search Report and Written Opinion issued in PCT Application No. PCT/US2016/033966, dated Sep. 9, 2016, 11 pages.

(Continued)

*Primary Examiner* — Mohammed Rehman
*Assistant Examiner* — Gayathri Sampath
(74) *Attorney, Agent, or Firm* — Grossman, Tucker, Perreault & Pfleger, PLLC (57) ABSTRACT

The present disclosure is directed to firmware block dispatch based on fusing. A device may determine firmware blocks to load during initialization of the device based on fuses set in a processing module in the device. A firmware module may comprise at least a nonvolatile (NV) memory including boot code and a firmware information table (FIT). During initialization the boot code may cause the processing module to read fuse information from a fuse module and to determine at least one firmware block to load based on the fuse information. For example, the fuse information may comprise a fuse string and the processing module may compare the fuse string to the FIT table, determine at least one pointer in the FIT table associated with the fuse string and load at least one firmware block based on a location (e.g., offset) in the NV memory identified by the at least one pointer.

21 Claims, 4 Drawing Sheets

(56) References Cited

U.S. PATENT DOCUMENTS

| | | | |
|---|---|---|---|
| 2006/0239088 A1* | 10/2006 | Anand | G11C 17/165 |
| | | | 365/200 |
| 2007/0192611 A1* | 8/2007 | Datta | G06F 21/60 |
| | | | 713/176 |
| 2009/0037904 A1 | 2/2009 | Cohen et al. | |
| 2009/0144559 A1* | 6/2009 | Lee | G06F 21/575 |
| | | | 713/189 |
| 2011/0154011 A1* | 6/2011 | Efraim | G06F 21/572 |
| | | | 713/100 |
| 2012/0137049 A1* | 5/2012 | Mollichelli | G06F 12/0246 |
| | | | 711/103 |

OTHER PUBLICATIONS

Intel Firmware Support Package, www.intel.com/fsp, 7 pages.
Coreboot: fast and flexible Open Source firmware, www.coreboot.org, 1 page.
UEFI Development Kit 2014 (UDK2014), Continuing with the UEFI Open Source Community, www.tianocore.org, 1 page.
Spring, Tom, "Rackspace Puts Intel Aside, Makes IBM OpenPower Pledge," http://www.crn.com/news/cloud/300075140/rackspace-puts-intel-aside-makes-ibm-openpower-pledge.htm, Dec. 16, 2014, 2 pages.

* cited by examiner

FIRMWARE BLOCK DISPATCH BASED ON FUSING

TECHNICAL FIELD

The present disclosure relates to device firmware implementation, and more particularly, to a system to determine firmware blocks for dispatch based on fusing in a processor module.

BACKGROUND

Device initialization may comprise operations executed when a device is initialized (e.g., powered up, rebooted, etc.). For example, during device initialization firmware (e.g., software encoded in at least one electronic component in the device) may be loaded and/or executed by at least one microprocessor in the device to configure equipment and load software into the device. Basic software resources may include, for example, a kernel (e.g., software to manage interaction between device hardware and higher-level software components like an operating system (OS)), drivers, utilities, etc. Thus, the ability of the OS to interact with hardware in the device may rely on the firmware that is loaded during device initialization, and the firmware that is loaded during device initialization may depend highly on the equipment installed in, or coupled to, the device.

Traditionally, firmware is developed and maintained by designers at the manufacturer of the device. This helps ensure that the firmware will execute as expected and in a stable manner, is secure, that updates will maintain stable performance, etc. Moreover, these same operational characteristics firmware may be maintained by "locking down" firmware to prevent intermediate users (e.g., original equipment manufacturers, integrators, etc.) and/or end users from being able to perform modifications. While the rationale for these behaviors is clear, in the changing realm of modern technology they are becoming problematic. Relying on a certain group of developers to develop firmware for a complex platform may create a "silo effect" in that divisions may exist between development teams responsible for hardware and firmware. This places a large burden on firmware developers to service a variety of different consumers. Moreover, the availability of open-source firmware (e.g., firmware code and development tools that may be publicly available without a fee or need to license) may facilitate intermediate and/or end users in formulating their own firmware that may, for example, load features such as enhanced security resources, custom equipment configurations and/or drivers, performance tracking and/or enhancement applications, end use-specific utilities, etc. Users crave the customizability provided by open source firmware.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

The present disclosure is directed to firmware block dispatch based on fusing. In general, a device may determine firmware blocks to load during initialization of the device based on fuses set in a processing module in the device. A firmware module in the device may comprise at least a nonvolatile (NV) memory including boot code and a firmware information table (FIT). During device initialization the processing module may execute the boot code. The boot code may cause the processing module to at least read fuse information from a fuse module within the processing module and to determine at least one firmware block to load based on the fuse information. For example, the fuse information may comprise at least a fuse string and the processing module may compare the fuse string to the FIT table, determine at least one pointer in the FIT table associated with the fuse string and load at least one firmware block from at least one location (e.g. memory offset) in the NV memory identified by the at least one pointer. Moreover, in some embodiments the boot code may cause the processing module to also load security resources to authenticate the at least one firmware block prior to the at least one firmware block being loaded.

In at least one embodiment, an example device to dispatch firmware blocks based on fusing may comprise a firmware module, at least one firmware block and a processing module. The firmware module may include at least one NV memory to store boot code. The processing module may include at least data processing circuitry and a fuse module. The data processing circuitry may be to execute the boot code during device initialization, the boot code causing the data processing circuitry to at least read fuse information from the fuse module, determine at least one firmware block to load based on the fuse information and load the at least one firmware block.

The firmware module may comprise, for example, at least a FIT including at least one pointer to the at least one firmware block. An agent associated with each firmware block may be to create the at least one pointer for the at least one firmware block in the firmware information table. The at least one firmware block may be stored in the NV memory and the at least one pointer is a memory offset to where the at least one firmware block is located in the NV memory.

In at least one embodiment, the processing module may be configured based on a system on a chip architecture comprising a plurality of subsystems. The fuse information may comprise at least a fuse string dedicated to indicating to the processing module which of a plurality of firmware blocks corresponding to at least each of the plurality of subsystems to load during device initialization. In the same or a different embodiment, the boot code may be to cause the data processing circuitry to also load security resources during device initialization. The security resources may be to cause the data processing circuitry to authenticate the at least one firmware block prior to loading the at least one firmware block.

Consistent with the present disclosure, an example firmware module may comprise at least one nonvolatile memory to store boot code, a firmware information table and at least one firmware block, wherein the boot code is to cause a processing module to read fuse information from a fuse module in the processing module, determine at least one firmware block to load based on the fuse information and load the at least one firmware block. The FIT may include at least one pointer to the at least one firmware block in the at least one nonvolatile memory. The boot code may be to cause the processing module to also load security resources to authenticate the at least one firmware block prior to loading the at least one firmware block. Consistent with the present disclosure, an example method for fuse-based firmware block dispatching may comprise executing boot code stored in a firmware module during initialization of a device, reading fuse information from a fuse module in a processing module in the device, determining at least one firmware block to load based on the fuse information and loading the at least one firmware block.

Figure 1:
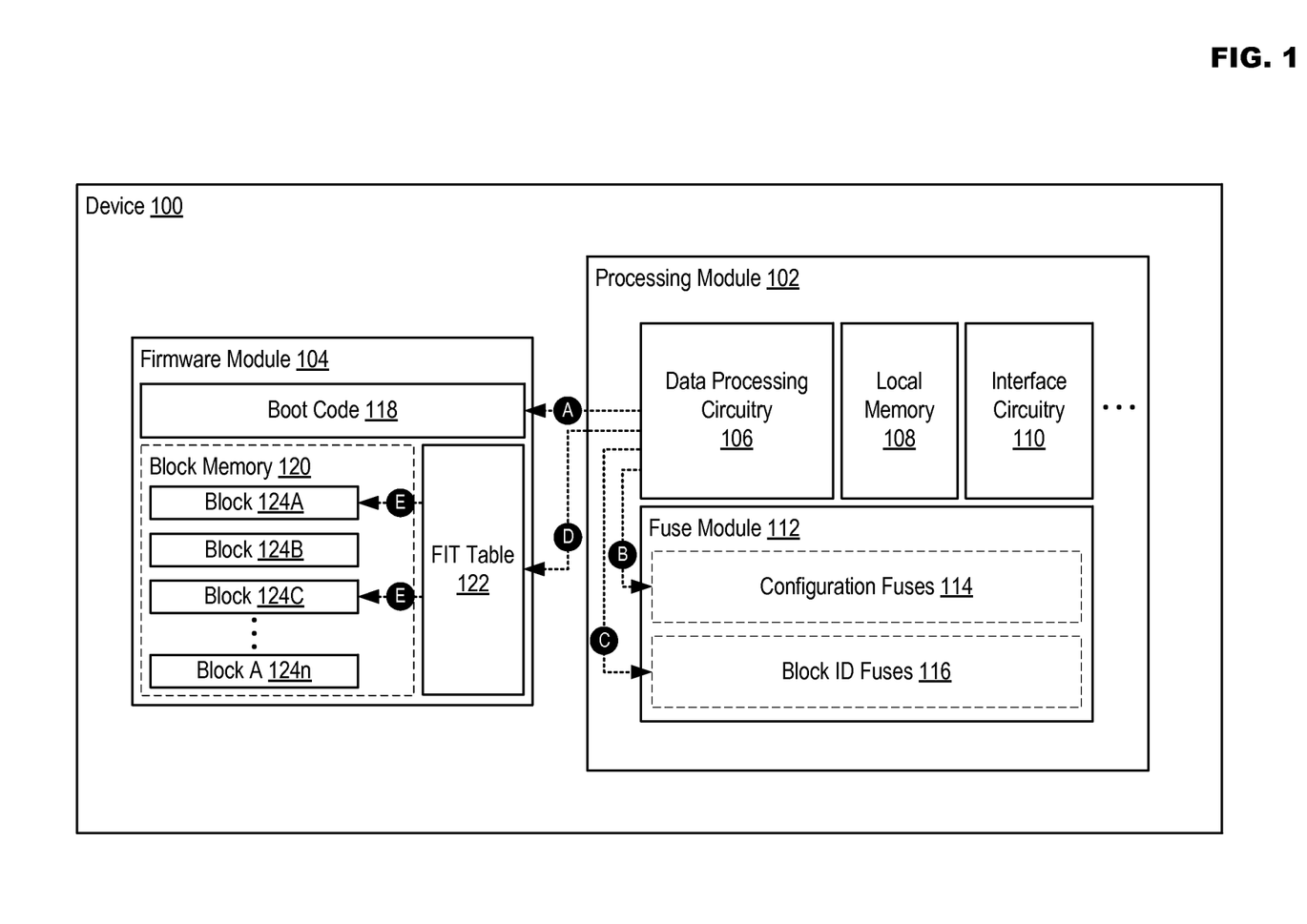
FIG. 1 illustrates an example device configured for firmware block dispatch based on fusing in accordance with at least one embodiment of the present disclosure.

FIG. 1 illustrates an example device configured for firmware block dispatch based on fusing in accordance with at least one embodiment of the present disclosure. The following may make reference to, or may employ terminology commonly associated with, certain technologies for implementing firmware such as the Basic Input Output System (BIOS), Unified Extensible Firmware Interface (UEFI), etc., certain integrated circuit (IC) technologies such as those related to microprocessors manufactured by the Intel Corporation, etc. These references are employed herein merely for the sake of explanation, and are not intended to limit embodiments consistent with the present disclosure to any particular manner of implementation. While these example technologies may provide a basis for understanding the embodiments, actual implementations may employ other similar technologies existing now or developed in the future.

In general, device 100 may be any apparatus that comprises resources for processing data (e.g., to receive a data input, process the data and generate an output). Examples of device 100 may include, but are not limited to, a mobile communication device such as a cellular handset or a smartphone based on the Android® OS from the Google Corporation, iOS® or Mac OS® from the Apple Corporation, Windows® OS from the Microsoft Corporation, Tizen® OS from the Linux Foundation, Firefox® OS from the Mozilla Project, Blackberry® OS from the Blackberry Corporation, Palm® OS from the Hewlett-Packard Corporation, Symbian® OS from the Symbian Foundation, etc., a mobile computing device such as a tablet computer like an iPad® from the Apple Corporation, Surface® from the Microsoft Corporation, Galaxy Tab® from the Samsung Corporation, Kindle® from the Amazon Corporation, etc., an Ultrabook® including a low-power chipset from the Intel Corporation, a netbook, a notebook, a laptop, a palmtop, etc., a wearable device such as a wristwatch form factor computing device like the Galaxy Gear® from Samsung, an eyewear form factor computing device/user interface like Google Glass® from the Google Corporation, a virtual reality (VR) headset device like the Gear VR® from the Samsung Corporation, the Oculus Rift® from the Oculus VR Corporation, etc., a typically stationary computing device such as a desktop computer, a server, a group of computing devices organized in a high performance computing (HPC) architecture, a smart television or other type of "smart" device, small form factor computing solutions (e.g., for space-limited applications, TV set-top boxes, etc.) like the Next Unit of Computing (NUC) platform from the Intel Corporation, etc.

Device 100 may comprise, for example, at least processing module 102 and firmware module 104. Consistent with the present disclosure, processing module 102 may be configured as a system on a chip (SoC). An SoC may integrate different functionalities (e.g., subsystems) typically associated with a computing device into a single IC package. The incorporation of a variety of subsystems into processing module 102 may allow the overall size of device 100 to shrink as this functionality no longer needs to be provided by standalone resources in device 100. Examples of subsystems that may be incorporated into processing module 102 may include, but are not limited to, data processing circuitry 106, local memory 108, interface circuitry 110, etc. Data processing circuitry 106 may comprise at least data processing hardware (e.g., at least one processor core). Local memory 108 may comprise volatile memory (e.g., cache memory to hold data being processed by data processing circuitry 106) and/or NV memory that may store data in a semi-permanent manner. Interface circuitry 110 may comprise at least hardware resources that allow processing module to interact with other resources in device 100. Processing module 100 may further comprise fuse module 112. As referenced herein, a "fuse" may be a digital bit that may be set/reset (e.g., 0 or 1) and may be readable by at least data processing circuitry 106. For example, fuse module 112 may comprise at least one array of fuses organized as, but not limited to, configuration fuses 114 and block identification (ID) fuses 116. Configuration fuses 114 may include fuses that control the initialization of processing module 102, indicate features that are available in processing module 102, enable/disable features within processing module 102, etc.

Consistent with the present disclosure, block ID fuses 116 in fuse module 112 may be fuses dedicated to identifying firmware blocks to load during the initialization of device 100. In at least one embodiment, firmware module 104 may comprise boot code 118, block memory 120 and FIT table 122. Boot code 118 may be executed to configure device 100 during initialization. For example, boot code 118 may configure processing module 102 and may cause various code to be loaded in device 100 in support of processing module 102 and other systems in device 100. In at least one embodiment, boot code 118 may be p-code (e.g., assembly language executable by data processing circuitry 106). Block memory 120 may be an NV memory to store at least firmware block 124A, block 124B, block 124C . . . block 124n (hereafter, "blocks 124A . . . n"). As referenced herein, firmware blocks may be sections of code that may be loaded individually or in groups by data processing circuitry 106. For example, given that processing module 102 may be considered an SoC including multiple subsystems, at least one block 124A . . . n may be loaded for each subsystem. Blocks 124A . . . n may include, for example, hardware drivers, utilities, software interfaces to support the operation of subsystems in processing module 102 or resources existing elsewhere in device 100, software libraries, security resources, user-customized code generated employing a variety of open source firmware technologies including, but not limited to, coreboot (www.coreboot.org), EDK II (www.tianocore.org), U-Boot (http.//www.denx.de/wiki/U-Boot), etc. FIT table 122 may include at least fuse information and corresponding pointers to locations of blocks 124A . . . n in block memory 120. Fuse information may include one fuse setting or a combination of different fuse settings. Pointers may include memory offsets indicating where each of blocks 124A . . . n start in block memory 120, the length of each of blocks 124A . . . n, etc. In at least one embodiment, an agent (e.g., a program running autonomously in device 100) may be associated one or more blocks 124A . . . n. For example, an agent may install a block (e.g., block 124A) into block memory 120 and enter fuse information with a corresponding pointer into FIT table 122 so that reading the fuse information in block ID fuses 116 may trigger block 124A to be loaded into device 100 from the appropriate location in block memory 120.

In an example of operation, device initialization (e.g., due to power up, reboot, etc. of device 100) may cause data processing circuitry 106 to execute boot code 118 as shown at "A" in FIG. 1. The execution of boot code 118 may cause data processing circuitry 106 to configure hardware (e.g., processing module 102 and/or other resources) based on configuration fuses 114 as shown at "B" in FIG. 1. Data processing circuitry 106 may further read block ID fuses 116 as shown at "C" in FIG. 1 to obtain fuse information including, for example, a fuse string (e.g., a series of fuses settings). The fuse string may then be compared to FIT table 122 as shown at "D" in FIG. 1 to obtain the pointers to blocks 124A . . . n in block memory 120 to load. In the example of FIG. 1, the fuse string may indicate to load certain firmware (e.g., blocks 124A and 124C as shown at "E" in FIG. 1.). Data processing circuitry 106 may proceed to load blocks 124A and 124C and may continue with initialization of device 100 until complete. The loading of blocks 124A . . . n in device 100 may also be referred to as "dispatching" herein as these blocks are being "dispatched" for loading into device 100.

In at least one embodiment, processing module 102 may load security resources prior to loading blocks 124A . . . 0 in device 100. For example, these security resources may ensure that blocks 124A . . . 0 are safe to load (e.g., do not include malware, will not compromise the stability or security of device 100, etc.). For example, each block 124A . . . n may be signed using a private key corresponding to a public key held in processing module 102 (e.g., in local memory 108). Each block 124A . . . n may then be authenticated prior to loading by verifying the signature. In another embodiment, a trusted execution environment (TEE) may be established in device 100 prior to loading blocks 124A . . . n. For example, Software Guard Extensions (SGX) technology from the Intel Corporation may facilitate the establishment of a secure (e.g. encrypted) memory area in device 100 wherein only known-good applications may execute such as security-related applications, applications that control access to critical systems in device 100, etc. The known-good applications may measure (e.g., determine a hash value of) subsequently loaded software like blocks 124A . . . n, and may compare these measurements to measurements of known good versions of blocks 124A . . . n to ensure that only safe versions of blocks 124A . . . n are loaded. In this manner, not only may embodiments consistent with the present disclosure be flexible in that various blocks 124A . . . n may be loaded, but they may also be safe from disruption by malware. Various benefits may be realized in embodiments consistent with the present disclosure.

The modular nature of blocks 124A . . . n may allow for the development of firmware that may be employed universally across different platforms. For example, a firmware image may be loaded into device 100 that incorporates various blocks 124A . . . n, but only the blocks 124A . . . n that are needed in device 100 may be loaded. This alleviates the need for a custom firmware image for every type of device 100. The firmware image may be modified by altering, adding, removing blocks 124A . . . n without having to reformulate the entire firmware image. Hardware designers may develop new blocks 124A . . . n to support emerging equipment. These new blocks 124A . . . n may be added to the firmware image as they are developed and automatically loaded into devices 100 that comprise the new equipment. This manner of firmware development may better couple firmware and hardware, and may reduce reliance on a centralized firmware development group.

Moreover, end users may be able to develop their own blocks 124A . . . n (e.g., using open source technology) for inclusion in device 100 without compromising the remainder of the firmware. For example, device 100 may be developed to load blocks 124A . . . n that protect critical and/or vulnerable systems from modification or attack. Thus, an end-user may add functionality to device 100 with their own blocks 124A . . . n without jeopardizing the stability, security, etc. of device 100.

Figure 2:
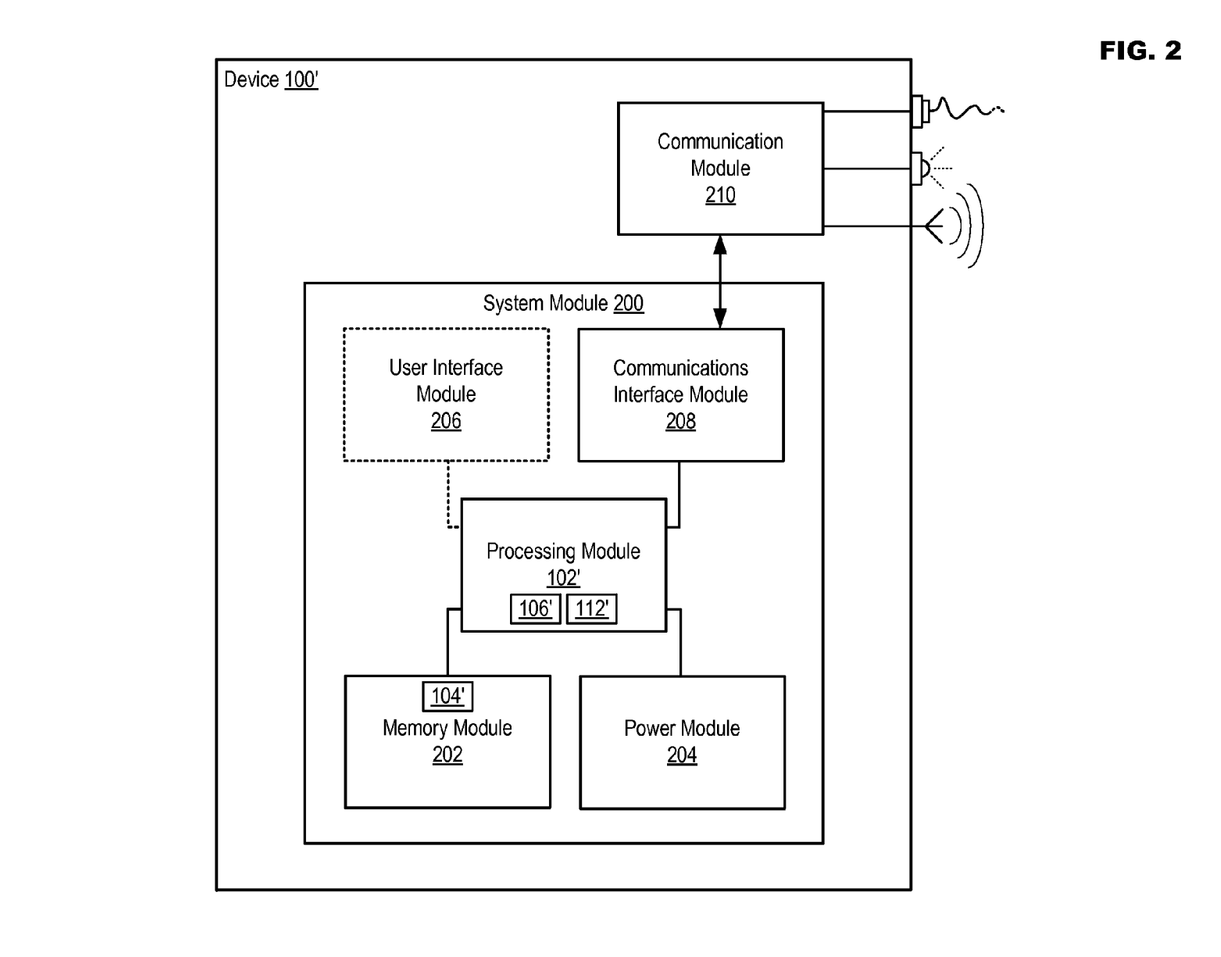
FIG. 2 illustrates an example configuration for a device usable in accordance with at least one embodiment of the present disclosure.

FIG. 2 illustrates an example configuration for a system usable in accordance with at least one embodiment of the present disclosure. The inclusion of an apostrophe after an item number (e.g., 100') in the present disclosure may indicate that an example embodiment of the particular item is being illustrated. For example, device 100' may be capable of performing any or all of the activities disclosed in FIG. 1. However, device 100' is presented only as an example of an apparatus usable in embodiments consistent with the present disclosure, and is not intended to limit any of the embodiments disclosed herein to any particular manner of implementation.

Device 100' may comprise, for example, system module 200 to manage operation of the device. System module 200 may include, for example, processing module 102', memory module 202, power module 204, user interface module 206 and communication interface module 208. Device 100' may further include communication module 210. While communication module 210 is illustrated as separate from system module 200, the example configuration shown in FIG. 2 has been provided herein merely for the sake of explanation. Some or all of the functionality associated with communication module 210 may also be incorporated into system module 200.

In device 100', processing module 102' may comprise one or more processors situated in separate components, or alternatively one or more processing cores in a single component (e.g., in a SoC), along with processor-related support circuitry (e.g., bridging interfaces, etc.). Example processors may include, but are not limited to, various x86-based microprocessors available from the Intel Corporation including those in the Pentium, Xeon, Itanium, Celeron, Atom, Quark, Core i-series, Core M-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing module 102' may interact with other system components that may be operating at different speeds, on different buses, etc. in device 100'. Moreover, some or all of the functionality commonly associated with the support circuitry may also be included in the same physical package as the processor (e.g., such as in the Sandy Bridge family of processors available from the Intel Corporation).

Processing module 102' may be configured to execute various instructions in device 100'. Instructions may include program code configured to cause processing module 102' to perform activities related to reading data, writing data, processing data, formulating data, converting data, transforming data, etc. Information (e.g., instructions, data, etc.) may be stored in memory module 202. Memory module 202 may comprise random access memory (RAM) and/or read-only memory (ROM) in a fixed or removable format. RAM may include volatile memory configured to hold information during the operation of device 100' such as, for example, static RAM (SRAM) or Dynamic RAM (DRAM). ROM may include non-volatile (NV) memory modules configured based on BIOS, UEFI, etc. to provide instructions when device 100' is activated, programmable memories such as electronic programmable ROMs (EPROMS), Flash, etc. Other fixed/removable memory may include, but are not limited to, magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, etc.

Power module 204 may include internal power sources (e.g., a battery, fuel cell, etc.) and/or external power sources (e.g., electromechanical or solar generator, power grid, external fuel cell, etc.), and related circuitry configured to supply device 100' with the power needed to operate. User interface module 206 may include hardware and/or software to allow users to interact with device 100' such as, for example, various input mechanisms (e.g., microphones, switches, buttons, knobs, keyboards, speakers, touch-sensitive surfaces, one or more sensors configured to capture images and/or sense proximity, distance, motion, gestures, orientation, biometric data, etc.) and various output mechanisms (e.g., speakers, displays, lighted/flashing indicators, electromechanical components for vibration, motion, etc.). The hardware in user interface module 206 may be incorporated within device 100' and/or may be coupled to device 100' via a wired or wireless communication medium. User interface module 206 may be optional in certain circumstances such as, for example, a situation wherein device 100' is a server (e.g., rack server, blade server, etc.) that does not include user interface module 206, and instead relies on another device (e.g., a management terminal) for user interface functionality.

Communication interface module 208 may be configured to manage packet routing and other control functions for communication module 210, which may include resources configured to support wired and/or wireless communications. In some instances, device 100' may comprise more than one communication module 210 (e.g., including separate physical interface modules for wired protocols and/or wireless radios) managed by a centralized communication interface module 208. Wired communications may include serial and parallel wired mediums such as, for example, Ethernet, USB, Firewire, Thunderbolt, Digital Video Interface (DVI), High-Definition Multimedia Interface (HDMI), etc. Wireless communications may include, for example, close-proximity wireless mediums (e.g., radio frequency (RF) such as based on the RF Identification (RFID) or Near Field Communications (NFC) standards, infrared (IR), etc.), short-range wireless mediums (e.g., Bluetooth, WLAN, Wi-Fi, etc.), long range wireless mediums (e.g., cellular wide-area radio communication technology, satellite-based communications, etc.), electronic communications via sound waves, etc. In one embodiment, communication interface module 208 may be configured to prevent wireless communications that are active in communication module 210 from interfering with each other. In performing this function, communication interface module 208 may schedule activities for communication module 210 based on, for example, the relative priority of messages awaiting transmission. While the embodiment disclosed in FIG. 2 illustrates communication interface module 208 being separate from communication module 210, it may also be possible for the functionality of communication interface module 208 and communication module 210 to be incorporated into the same module.

Consistent with the present disclosure, processing module 102' may interact with at least memory module 202 during the initialization of device 100'. For example, processing module 102' may comprise at least data processing circuitry 106' and fuse module 112', while memory module 202 may comprise at least firmware module 104'. In an example of operation, at least data processing circuitry 106' may execute boot code 118 stored in firmware module 104'. Boot code 118 may then cause data processing circuitry 106' to then read a fuse string block ID fuses 116, compare the fuse string to FIT table 122 in firmware module 104' (e.g., to compare the fuse string to fuse settings and/or combinations of fuse settings configured by agents in FIT table 122) and load blocks 124A . . . n indicated to correspond to the fuse string by FIT table 122.

Figure 3:
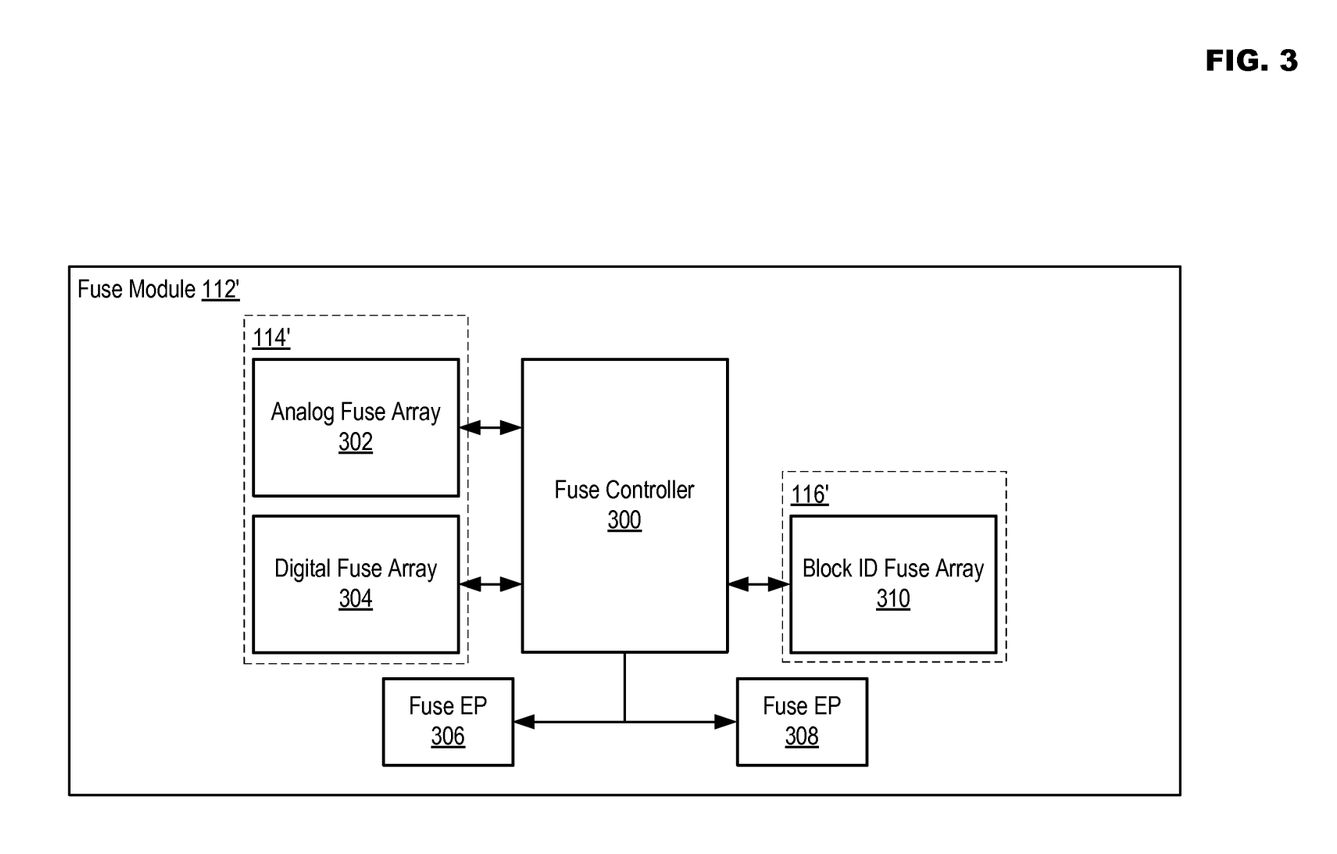
FIG. 3 illustrates an example configuration for a fuse module in accordance with at least one embodiment of the present disclosure.

FIG. 3 illustrates an example configuration for a fuse module in accordance with at least one embodiment of the present disclosure. Fuse module 112' may comprise, for example, fuse controller 300, configuration fuses 114' including at least analog fuse array 302 and digital fuse array 304, fuse endpoint (EP) 306, fuse endpoint 308 and block ID fuses 116' including at least block ID fuse array 310. Fuse controller 300 may comprise logic circuitry that controls the fuse arrays. For example, fuse controller 300 may set/reset fuses in analog fuse array 302, digital fuse array 304 and/or block ID fuse array 310. In at least one embodiment, data processing circuitry 106 may utilize fuse controller 300 to read fuses in arrays 302, 304 and/or 306. Analog fuse array 302 may comprise fuses that control analog elements of processing module 102. Digital fuse elements may comprise fuses that control digital elements of processing module 102. Fuse EP 306 and 308 may correspond to analog fuse array 302 and digital fuse array 304, respectively. Fuse EP 306 and 308 may indicate to fuse controller 300 where analog fuse array 302 and digital fuse array 304 terminate. While it may be possible to store block ID fuses in an already existing fuse array, in at least one embodiment block ID fuse array 310 may be a separate array dedicated to identifying what code blocks 124A . . . D to load during the initialization of device 100. Block ID fuse array 310 may be configured to identify code blocks 124A . . . D to load utilizing only one fuse (e.g., one bit) or may utilize combinations of fuses to identify code blocks 124A . . . D to load.

Figure 4:
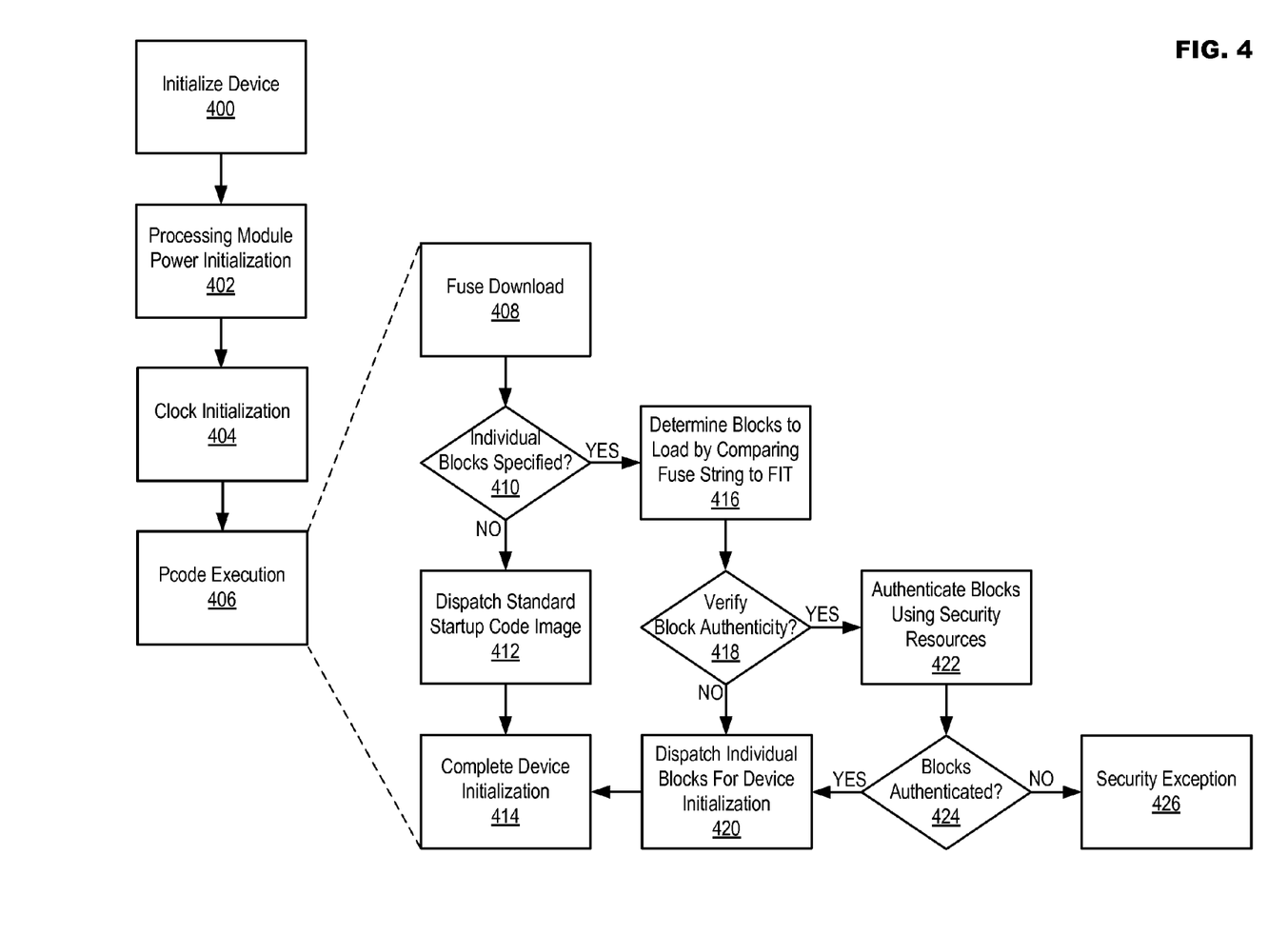
FIG. 4 illustrates example operations for firmware block dispatch based on fusing in accordance with at least one embodiment of the present disclosure.

FIG. 4 illustrates example operations for firmware block dispatch based on fusing in accordance with at least one embodiment of the present disclosure. A device may be initialized (e.g., powered up, rebooted, etc.) in operation 400. In at least one embodiment, initialization of the device may be followed by a processing module in the device executing boot code that may cause the processing module to perform operations 402 to 406. In operation 402 processing module power initialization may occur. For example, the processing module may comprise a fully integrated voltage regulator (FIVR) that may be initialized, ramped up, debugged, etc. as part of operation 402. At least one clock may then be initialized in operation 404. For example, in operation 402 at least one clock in the processing module may at least be activated. P-code may then be executed in operation 406. Operations 408 to 426 may occur as a part of operation 406 (e.g., the p-code may cause the processing module to perform operations 408 to 426).

In operation 408 a fuse download may occur. The fuse download may include reading fuse information from at least one fuse array in the processing module. A determination may then be made in operation 410 as to whether the fuse information downloaded in operation 408 specifies individual firmware blocks to load. If in operation 410 it is determined that individual blocks are not specified in the fuse information, then in operation 412 a standard startup code image may be dispatched for loaded. The standard startup code image may correspond to a type of device, a type of processing module, etc., and may include all the firmware needed for basic operation of the device. Initialization of the device may then be completed in operation 414.

If in operation 410 it is determined that individual blocks are specified, then in operation 416 the particular firmware blocks to load may be determined by comparing a fuse string in the downloaded fuse information to a FIT table in a firmware module in the device. A determination may then be made in operation 418 as to whether the authenticity of the firmware blocks to load should be authenticated. If in operation 418 it is determined that authentication of the blocks is not necessary, then in operation 420 the blocks may be dispatched for device initialization and initialization may be complete in operation 414. If in operation 418 it is determined that blocks to be loaded should first be authenticated, then in operation 422 security resources in the device may be employed to verify the authenticity of the blocks. A determination in operation 424 that all of the blocks to be loaded are authentic may be followed by dispatching the blocks for device initialization in operation 420. If it is determined in operation 424 that any of the blocks to be loaded cannot be authenticated, then in operation 426 a security exception may occur. A security exception may include, for example, one or more of ceasing the device initialization, not loading the firmware block that was not authenticated (if possible), returning to a previously good device initialization flow (e.g., including known good versions of firmware modules), notifying a device user, intermediate device provider and/or device manufacturer that an error has occurred during device initialization, etc.

While FIG. 4 illustrates operations according to an embodiment, it is to be understood that not all of the operations depicted in FIG. 4 are necessary for other embodiments. Indeed, it is fully contemplated herein that in other embodiments of the present disclosure, the operations depicted in FIG. 4, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, the present disclosure is directed to firmware block dispatch based on fusing. A device may determine firmware blocks to load during initialization of the device based on fuses set in a processing module in the device. A firmware module may comprise at least a nonvolatile (NV) memory including boot code and a firmware information table (FIT). During initialization the boot code may cause the processing module to read fuse information from a fuse module and to determine at least one firmware block to load based on the fuse information. For example, the fuse information may comprise a fuse string and the processing module may compare the fuse string to the FIT table, determine at least one pointer in the FIT table associated with the fuse string and load at least one firmware block based on a location (e.g., offset) in the NV memory identified by the at least one pointer.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for firmware block dispatch based on fusing.

According to example 1 there is provided a device to dispatch firmware blocks based on fusing. The device may comprise a firmware module including at least one nonvolatile memory to store boot code, at least one firmware block and a processing module including at least data processing circuitry and a fuse module, wherein the data processing circuitry is to execute the boot code during device initialization, the boot code causing the data processing circuitry to at least read fuse information from the fuse module, determine at least one firmware block to load based on the fuse information and load the at least one firmware block.

Example 2 may include the elements of example 1, wherein the firmware module comprises at least a firmware information table including at least one pointer to the at least one firmware block.

Example 3 may include the elements of example 2, wherein an agent associated with each firmware block is to create the at least one pointer for the at least one firmware block in the firmware information table.

Example 4 may include the elements of any of examples 2 to 3, wherein the at least one firmware block is stored in the nonvolatile memory and the at least one pointer is a memory offset to where the at least one firmware block is located in the nonvolatile memory.

Example 5 may include the elements of any of examples 1 to 4, wherein the processing module is configured based on a system on a chip architecture comprising a plurality of subsystems.

Example 6 may include the elements of example 5, wherein the plurality of subsystems comprise at least the data processing circuitry, local memory and interface circuitry.

Example 7 may include the elements of any of examples 5 to 6, wherein the fuse information comprises at least a fuse string dedicated to indicating to the processing module which of a plurality of firmware blocks corresponding to at least each of the plurality of subsystems to load during device initialization.

Example 8 may include the elements of any of examples 1 to 7, wherein the boot code is to cause the data processing circuitry to also load security resources during device initialization.

Example 9 may include the elements of example 8, wherein the security resources are to cause the data processing circuity to authenticate the at least one firmware block prior to loading the at least one firmware block.

Example 10 may include the elements of example 9, wherein the security resources authenticate the at least one firmware block via checking a signature corresponding to the at least one firmware block or measuring the at least one firmware block and comparing the measurement to a prior measurement of a known good firmware block.

Example 11 may include the elements of any of examples 1 to 10, wherein the processing module is configured based on a system on a chip architecture comprising a plurality of subsystems, the fuse information comprising at least a fuse string dedicated to indicating to the processing module which of a plurality of firmware blocks corresponding to at least each of the plurality of subsystems to load during device initialization.

Example 12 may include the elements of any of examples 1 to 11, wherein the boot code is to cause the data processing circuitry to also load security resources during device initialization, the security resources being to cause the data processing circuity to authenticate the at least one firmware block prior to loading the at least one firmware block.

Example 13 may include the elements of any of examples 1 to 12, wherein the fuse module comprises configuration fuses, blocks ID fuses, at least one fuse endpoint corresponding to at least the configuration fuses and a fuse controller.

Example 14 may include the elements of example 13, wherein the configuration fuses comprise at least one of analog fuse array or a digital fuse array.

Example 15 may include the elements of any of examples 13 to 14, wherein the blocks ID fuses comprise at least one block ID fuse array.

Example 16 may include the elements of any of examples 1 to 15, wherein the at least one firmware block is formulated utilizing open source firmware technology.

According to example 17 there is provided a firmware module. The firmware module may comprise at least one nonvolatile memory to store boot code, a firmware information table and at least one firmware block, wherein the boot code is to cause a processing module to read fuse information from a fuse module in the processing module, determine at least one firmware block to load based on the fuse information and load the at least one firmware block.

Example 18 may include the elements of example 17, wherein the firmware information table includes at least one pointer to the at least one firmware block in the at least one nonvolatile memory.

Example 19 may include the elements of example 18, wherein the pointer is a memory offset indicating the location of the at least one firmware block in the nonvolatile memory.

Example 20 may include the elements of any of examples 17 to 19, wherein the boot code is to cause the processing module to also load security resources to authenticate the at least one firmware block prior to loading the at least one firmware block.

According to example 21 there is provided a method for fuse-based firmware block dispatching. The method may comprise executing boot code stored in a firmware module during initialization of a device, reading fuse information from a fuse module in a processing module in the device, determining at least one firmware block to load based on the fuse information and loading the at least one firmware block.

Example 22 may include the elements of example 21, and may further comprise initializing power resources and at least one clock in the processing module prior to reading the fuse information.

Example 23 may include the elements of any of examples 21 to 22, wherein reading fuse information comprises determining if individual firmware blocks are specified for loading.

Example 24 may include the elements of example 23, and may further comprise loading a standard startup code image if it is determined that individual firmware blocks are not specified for loading.

Example 25 may include the elements of any of examples 21 to 24, wherein reading fuse information comprises reading a fuse string from the fuse module.

Example 26 may include the elements of example 25, wherein determining at least one firmware block to load comprises comparing the fuse string to a firmware information table in the firmware module.

Example 27 may include the elements of any of examples 21 to 26, and may further comprise loading security resources to authenticate the at least one firmware module prior to loading the at least one firmware module.

Example 28 may include the elements of any of examples 21 to 27, wherein reading fuse information comprises reading a fuse string from the fuse module and determining at least one firmware block to load comprises comparing the fuse string to a firmware information table in the firmware module.

According to example 29 there is provided a system including at least a device, the system being arranged to perform the method of any of the above examples 21 to 28.

According to example 30 there is provided a chipset arranged to perform the method of any of the above examples 21 to 28.

According to example 31 there is provided at least one machine readable medium comprising a plurality of instructions that, in response to be being executed on a computing device, cause the computing device to carry out the method according to any of the above examples 21 to 28.

According to example 32 there is provided a device configured for fuse-based firmware block dispatching, the device being arranged to perform the method of any of the above examples 21 to 28.

According to example 33 there is provided a system for fuse-based firmware block dispatching. The system may comprise means for executing boot code stored in a firmware module during initialization of a device, means for reading fuse information from a fuse module in a processing module in the device, means for determining at least one firmware block to load based on the fuse information and means for loading the at least one firmware block.

Example 34 may include the elements of example 33, and may further comprise means for initializing power resources and at least one clock in the processing module prior to reading the fuse information.

Example 35 may include the elements of any of examples 33 to 34, wherein the means for reading fuse information comprise means for determining if individual firmware blocks are specified for loading.

Example 36 may include the elements of example 35, and may further comprise means for loading a standard startup code image if it is determined that individual firmware blocks are not specified for loading.

Example 37 may include the elements of any of examples 33 to 36, wherein the means for reading fuse information comprise means for reading a fuse string from the fuse module.

Example 38 may include the elements of example 37, wherein the means for determining at least one firmware block to load comprise means for comparing the fuse string to a firmware information table in the firmware module.

Example 39 may include the elements of any of examples 33 to 38, and may further comprise means for loading security resources to authenticate the at least one firmware module prior to loading the at least one firmware module.

Example 40 may include the elements of any of examples 33 to 39, wherein the means for reading fuse information comprise means for reading a fuse string from the fuse module and the means for determining at least one firmware block to load comprise means for comparing the fuse string to a firmware information table in the firmware module.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device to dispatch firmware blocks based on fusing, comprising:
    a firmware module including at least one nonvolatile memory to store boot code;
    at least one firmware block; and
    a processing module including at least data processing circuitry and a fuse module, wherein:
    the fuse module comprises fuse information, wherein the fuse information comprises at least one fuse string comprising a plurality of fuses, and wherein each of said plurality of fuses is a digital bit that is configurable between a set and reset value and is readable by the data processing circuitry;
    the data processing circuitry is to execute the boot code during device initialization, the boot code causing the data processing circuitry to at least read fuse information from the fuse module, determine at least one firmware block to load based on the fuse information and load the at least one firmware block;
    wherein the firmware module further comprises at least a firmware information table including at least one pointer to the at least one firmware block, and during initialization of said device, the data processing circuitry is to compare said at least one fuse string to the firmware information table to obtain said at least one pointer to said at least one firmware block; and wherein the device is to load the at least one firmware block based on the obtained at least one pointer.

2. The device of claim 1, wherein an agent associated with each firmware block is to create the at least one pointer for the at least one firmware block in the firmware information table.

3. The device of claim 1, wherein the at least one firmware block is stored in the nonvolatile memory and the at least one pointer is a memory offset to where the at least one firmware block is located in the nonvolatile memory.

4. The device of claim 1, wherein the processing module is configured based on a system on a chip architecture comprising a plurality of subsystems.

5. The device of claim 4, wherein the at least one fuse string comprises at least a fuse string dedicated to indicating to the processing module which of a plurality of firmware blocks corresponding to at least each of the plurality of subsystems to load during device initialization.

6. The device of claim 1, wherein the boot code is to cause the data processing circuitry to also load security resources during device initialization.

7. The device of claim 6, wherein the security resources are to cause the data processing circuity to authenticate the at least one firmware block prior to loading the at least one firmware block.

8. A firmware module; comprising:
    at least one nonvolatile memory to store boot code, a firmware information table and at least one firmware block, wherein the boot code is to cause a processing module to read fuse information from a fuse module in the processing module, determine at least one firmware block to load based on the fuse information and load the at least one firmware block;
    wherein:
    the fuse information comprises at least one fuse string comprising a plurality of fuses; and each of the plurality of fuses is a digital bit that is configurable between a set and reset value and is readable by data processing circuitry in the processing module;

wherein:

the firmware information table includes at least one pointer to the at least one firmware block in the nonvolatile memory; and during initialization of said device, the boot code is to cause the data processing circuitry in the processing module to compare said at least one fuse string to the firmware information table to obtain said at least one pointer to said at least one firmware block, and to load the at least one firmware block based on the obtained at least one pointer.

9. The firmware module of claim 8, wherein the boot code is to cause the processing module to also load security resources to authenticate the at least one firmware block prior to loading the at least one firmware block.

10. A method for fuse-based firmware block dispatching, comprising:

executing boot code stored in a firmware module during initialization of a device;

reading fuse information from a fuse module in a processing module in the device, wherein the fuse information comprises at least one fuse string comprising a plurality of fuses, and wherein each of said plurality of fuses is a digital bit that is configurable between a set and reset value and is readable by data processing circuitry in the processing module;

determining at least one firmware block to load based on the fuse information, said determining comprising comparing, during initialization of said device, the at least one fuse string to a firmware information table in the firmware module to identify at least one pointer to at least one firmware block; and loading the at least one firmware block based on the identified at least one pointer.

11. The method of claim 10, further comprising:

initializing power resources and at least one clock in the processing module prior to reading the fuse information.

12. The method of claim 10, wherein reading fuse information comprises determining if individual firmware blocks are specified for loading.

13. The method of claim 12, further comprising:

loading a standard startup code image if it is determined that individual firmware blocks are not specified for loading.

14. The method of claim 10, wherein the at least one fuse string comprises at least a fuse string dedicated to indicating to the processing module which of a plurality of firmware blocks corresponding to a plurality of subsystems to load during said device initialization.

15. The method of claim 10, further comprising:

loading security resources to authenticate the at least one firmware module prior to loading the at least one firmware module.

16. At least one non-transitory machine-readable storage device having stored thereon, individually or in combination, instructions for fuse-based firmware block dispatching that, when executed by one or more processors, cause the one or more processors to:

execute boot code stored in a firmware module during initialization of a device;

read fuse information from a fuse module in a processing module in the device, wherein the fuse information comprises at least one fuse string comprising a plurality of fuses, wherein each of said plurality of fuses is a digital bit that is configurable between a set and reset value and is readable by data processing circuitry in the processing module;

determine, during initialization of the device, at least one firmware block to load based on the fuse information at least in part by comparing the at least one fuse string to a firmware information table in the firmware module to identify at least one pointer to at least one firmware block; and load the at least one firmware block based on the identified at least one pointer.

17. The non-transitory storage device of claim 16, further comprising instructions that, when executed by one or more processors, cause the one or more processors to:

initialize power resources and at least one clock in the processing module prior to reading the fuse information.

18. The non-transitory storage device of claim 16, wherein the instructions to read fuse information comprise instructions to determine if individual firmware blocks are specified for loading.

19. The non-transitory storage device of claim 18, further comprising instructions that, when executed by one or more processors, cause the one or more processors to:

load a standard startup code image if it is determined that individual firmware blocks are not specified for loading.

20. The non-transitory storage device of claim 16, wherein the at least one fuse string comprises at least a fuse string dedicated to indicating to the processing module which of a plurality of firmware blocks corresponding to a plurality of subsystems to load during said device initialization.

21. The non-transitory storage device of claim 16, further comprising instructions that, when executed by one or more processors, cause the one or more processors to:

load security resources to authenticate the at least one firmware module prior to loading the at least one firmware module.

* * * * *